(12) United States Patent
Li et al.

(10) Patent No.: US 10,922,430 B2
(45) Date of Patent: Feb. 16, 2021

(54) SYSTEM AND METHOD FOR DATA SECURITY GRADING

(71) Applicant: Beijing DiDi Infinity Technology and Development Co., Ltd., Beijing (CN)

(72) Inventors: Dong Li, Santa Clara, CA (US); Huaiyu Zhu, Newark, CA (US); Jing Chen, Palo Alto, CA (US)

(73) Assignee: Beijing DiDi Infinity Technology and Development Co., Ltd., Beijing (CN)

( * ) Notice: Subject to any disclaimer, the term of this patent is extended or adjusted under 35 U.S.C. 154(b) by 204 days.

(21) Appl. No.: 16/036,865

(22) Filed: Jul. 16, 2018

(65) Prior Publication Data
US 2020/0019722 A1    Jan. 16, 2020

(51) Int. Cl.
G06F 21/62 (2013.01)
G06F 16/22 (2019.01)
G06F 16/2455 (2019.01)

(52) U.S. Cl.
CPC ...... *G06F 21/6227* (2013.01); *G06F 16/2246* (2019.01); *G06F 16/2282* (2019.01); *G06F 16/2455* (2019.01)

(58) Field of Classification Search
CPC ............. G06F 21/6227; G06F 16/2246; G06F 16/2282; G06F 16/2455
USPC ......................................................... 726/27
See application file for complete search history.

(56) References Cited

U.S. PATENT DOCUMENTS

| | | | |
|---|---|---|---|
| 5,878,415 | A | 3/1999 | Olds |
| 2005/0132054 | A1 | 6/2005 | Chang et al. |
| 2006/0155677 | A1 | 7/2006 | Moses |
| 2010/0319067 | A1* | 12/2010 | Mohanty ............ G06F 21/6218 726/21 |
| 2014/0298481 | A1 | 10/2014 | Gilroy et al. |
| 2016/0350307 | A1 | 12/2016 | VerWeyst et al. |
| 2017/0300712 | A1* | 10/2017 | Timmerman ....... G06F 16/9535 |

FOREIGN PATENT DOCUMENTS

CN        104077284 A        10/2014

OTHER PUBLICATIONS

PCT International Search Report and the Written Opinion dated Mar. 21, 2019, issued in related International Application No. PCT/US2018/068075 (22 pages).

* cited by examiner

*Primary Examiner* — Michael S McNally
(74) *Attorney, Agent, or Firm* — Sheppard Mullin Richter & Hampton LLP

(57) ABSTRACT

Systems and methods are provided for data security grading. An exemplary method for data security grading, implementable by a computer, may comprise receiving a request to access a query data field, searching for the query data field from a security level table, in response to finding the query data field from the security level table, obtaining from the security level table a security level corresponding to the query data field, and in response to not finding the query data field from the security level table, determining a security level corresponding to the query data field based at least on a lineage tree and the security level table. The lineage tree may trace the query data field to one or more source data fields, and the security data level table may comprise one or more security levels corresponding to the one or more source data fields.

6 Claims, 8 Drawing Sheets

410

412: Grading one or more security levels of one or more source data fields in a data space according to one or more rules, the data space further comprising one or more derived data fields each containing data derived from one or more parent data fields

414: For a query data field, recording a SQL (Structured Query Language) statement for producing the query data field

416: Parsing the SQL statement

418: Constructing a lineage tree based on the parsed SQL statement, the lineage tree tracing the query data field to one or more parent data fields

419: Determining a security level of the query data field based at least on the lineage tree and one or more security levels of the one or more parent data fields of the query data field

422: Receiving a query associated with a query data field

424: Determining a security level of the query data field based on: one or more respective security levels of one or more immediate upper level data fields of the query data field, and a deriving function deriving data in the query data field from data in the one or more immediate upper level data fields

SYSTEM AND METHOD FOR DATA SECURITY GRADING

TECHNICAL FIELD

This disclosure generally relates to methods and devices for data security grading.

BACKGROUND

Data security is essential for most large-scale online operations, which may be constantly generating new data. With the rapid expansion of data sizes, assigning proper security levels to data fields becomes exceedingly challenging. Traditional rule-based methods are inadequate to handle the growing number of new datasets produced daily. Among many other challenges, existing tables or data fields have names created by different users and are mostly unintuitive as to their contents. Further, the content of the dataset may change from time to time, which requires a re-write of the created rules. Therefore, current technologies are incapable of grading data fields with proper security levels in a timely manner, exposing online data to significant risks.

SUMMARY

Various embodiments of the present disclosure can include systems, methods, and non-transitory computer readable media for data security grading. According to one aspect, an exemplary method for data security grading, implementable by a computer, may comprise receiving a request to access a query data field, searching for the query data field from a security level table, in response to finding the query data field from the security level table, obtaining from the security level table a security level corresponding to the query data field, and in response to not finding the query data field from the security level table, determining a security level corresponding to the query data field based at least on a lineage tree and the security level table. The lineage tree may trace the query data field to one or more source data fields, and the security data level table may comprise one or more security levels corresponding to the one or more source data fields.

In some embodiments, the lineage tree may trace a derived data field to one or more first level parent data fields, the each first level parent data field being the source data field or a first level derived data field, and the derived data field deriving from the one or more first level parent data fields based on a deriving function; for the first level derived data field, the lineage tree may trace the first level derived data field to one or more second level parent data fields, the each second level parent data field being the source data field or a second level derived data field, and the first level derived data field deriving from the one or more second level parent data fields based on another deriving function; the tracing may be replicable on any derived data field until tracing to one or more of the source date fields; and the lineage tree comprises the deriving functions.

In some embodiments, determining the security level corresponding to the query data field based at least on the lineage tree and the security level table may comprise, for the each derived data field at any level, obtaining the derived data field's security level based at least on (1) the deriving function of the derived data field and (2) security levels of the first level parent data fields of the derived data field, and determining one of the derived data fields corresponding to the query data field and using the determined derived data field's security level as the query data field's security level.

In some embodiments, the obtained derived data field's security level is the highest of the security levels of the first level parent data fields of the derived data field.

According to another aspect, a method for data security grading, implementable by a computer, may comprise grading one or more security levels of one or more source data fields in a data space according to one or more rules, the data space further comprising one or more derived data fields each containing data derived from one or more parent data fields, wherein the parent data field is the source data field or another derived data field; for a query data field, recording a SQL (Structured Query Language) statement for producing the query data field; parsing the SQL statement; constructing a lineage tree based on the parsed SQL statement, the lineage tree tracing the query data field to one or more parent data fields; and determining a security level of the query data field based at least on the lineage tree and one or more security levels of the one or more parent data fields of the query data field.

In some embodiments, determining the security level of the query data field based at least on the lineage tree and the one or more security levels of the one or more parent data fields of the query data field may comprise (1) determining one or more Nth security levels corresponding to one or more Nth level derived data fields deriving from the one or more source data fields in the lineage tree based on one or more corresponding Nth deriving functions and the security levels of the one or more source data fields, (2) determining one or more (N−1)th security levels corresponding to one or more (N−1)th level derived data fields deriving from the one or more source data fields and/or the Nth level derived data fields in the lineage tree based on one or more corresponding (N−1)th deriving functions and the security levels of the one or more source data fields and/or the one or more Nth security levels, and repeating step (2) in the lineage tree towards the query data field to determine the security level of the query data field.

In some embodiments, parsing the SQL statement may comprise converting the SQL statement to an abstract syntax tree, and constructing the lineage tree based on the parsed SQL statement may comprise traversing the abstract syntax tree to identify derivation relations among the query data field and one or more of the source data fields and/or derived data fields.

In some embodiments, the security levels of the query data field and the derived data fields may be determined based on immediate parent data fields.

According to another aspect, a system for data security grading may comprise a processor configured to receive a request to access a query data field, search for the query data field from a security level table, in response to finding the query data field from the security level table, obtain from the security level table a security level corresponding to the query data field, and in response to not finding the query data field from the security level table, determine a security level corresponding to the query data field based at least on a lineage tree and the security level table. The lineage tree may trace the query data field to one or more source data fields, and the security data level table may comprise one or more security levels corresponding to the one or more source data fields.

According to another aspect, a system for data security grading may comprise a processor configured to grade one or more security levels of one or more source data fields in a data space according to one or more rules, the data space further comprising one or more derived data fields each containing data derived from one or more parent data fields, wherein the parent data field is the source data field or another derived data field, for a query data field, record a SQL (Structured Query Language) statement for producing the query data field, parse the SQL statement, construct a lineage tree based on the parsed SQL statement, the lineage tree tracing the query data field to one or more parent data fields, and determine a security level of the query data field based at least on the lineage tree and one or more security levels of the one or more parent data fields of the query data field.

According to another aspect, a non-transitory computer-readable storage medium coupled to a processor may comprise instructions that, when executed by the processor, cause the processor to perform a method for data security grading. The method may comprise receiving a request to access a query data field, searching for the query data field from a security level table, in response to finding the query data field from the security level table, obtaining from the security level table a security level corresponding to the query data field, and in response to not finding the query data field from the security level table, determining a security level corresponding to the query data field based at least on a lineage tree and the security level table. The lineage tree may trace the query data field to one or more source data fields, and the security data level table may comprise one or more security levels corresponding to the one or more source data fields.

According to another aspect, a non-transitory computer-readable storage medium coupled to a processor may comprise instructions that, when executed by the processor, cause the processor to perform a method for data security grading. The method may comprise grading one or more security levels of one or more source data fields in a data space according to one or more rules, the data space further comprising one or more derived data fields each containing data derived from one or more parent data fields, wherein the parent data field is the source data field or another derived data field, for a query data field, recording a SQL (Structured Query Language) statement for producing the query data field, parsing the SQL statement, constructing a lineage tree based on the parsed SQL statement, the lineage tree tracing the query data field to one or more parent data fields, and determining a security level of the query data field based at least on the lineage tree and one or more security levels of the one or more parent data fields of the query data field.

According to another aspect, a method for data security grading, implementable by a computer, may comprise (1) receiving a query associated with a query data field, and (2) determining a security level of the query data field based on: one or more respective security levels of one or more immediate upper level data fields of the query data field, and a deriving function deriving data in the query data field from data in the one or more immediate upper level data fields.

In some embodiments, step (2) may comprise (3) for each of the one or more immediate upper level data fields that is a source data field, applying a security level associated with the each source data field to the step (2) determination, and (4) for each of the one or more immediate upper level data fields that is not a source data field, repeating step (2) treating the immediate upper level data field as the query data field, until obtaining only source data fields for the immediate upper level data fields and applying step (3).

These and other features of the systems, methods, and non-transitory computer readable media disclosed herein, as well as the methods of operation and functions of the related elements of structure and the combination of parts and economies of manufacture, will become more apparent upon consideration of the following description and the appended claims with reference to the accompanying drawings, all of which form a part of this specification, wherein like reference numerals designate corresponding parts in the various figures. It is to be expressly understood, however, that the drawings are for purposes of illustration and description only and are not intended as a definition of the limits of the invention.

BRIEF DESCRIPTION OF THE DRAWINGS

Certain features of various embodiments of the present technology are set forth with particularity in the appended claims. A better understanding of the features and advantages of the technology will be obtained by reference to the following detailed description that sets forth illustrative embodiments, in which the principles of the invention are utilized, and the accompanying drawings of which:

FIG. 4B illustrates a flowchart of another exemplary method for data security grading, in accordance with various embodiments.

DETAILED DESCRIPTION

Existing rule-based data security grading methods are inadequate to provide protection for a large amount of data that is subject to changes. Traditional rules rigidly based on features or properties of a data field often lose their effects at changes to the data content. Further, the table or field names commonly invoked in the rules may inaccurately or insufficiently capture the corresponding data content. As such, existing data security grading techniques demand constant updates to the rules and nevertheless still render the stored data under potential risks.

The disclosed systems and methods for data security grading at least mitigate the above disadvantages in current technologies. In various embodiments, some derived datasets comprising derived data fields can be created from a certain number of source datasets comprising source data fields, and more derived datasets can be created from the one or more existing derived datasets and/or the source datasets. An exemplary data space may comprise thousands of source data fields and millions of derived data fields. To efficiently grade these derived data fields, the disclosed methods may incorporate data lineage into the grading process, where the data lineage can trace each derived data field to one or more source data fields of determined security levels, directly or via one or more intermediate derived data fields. By the disclosed methods, security levels graded for source data fields can be automatically propagated through the intermediate derived data fields in various levels according to their derivation relations to reach any derived data field as queried, and can be dynamically adjusted in response to any change in the derivation relations or the data content. Thus, the disclosed methods obviate the constant creation of traditional grading rules for newly added or newly changed derived data fields, and can prevent erroneous gradings that rely on table or field names. Overall, the data security can be significantly enhanced.

Figure 1:
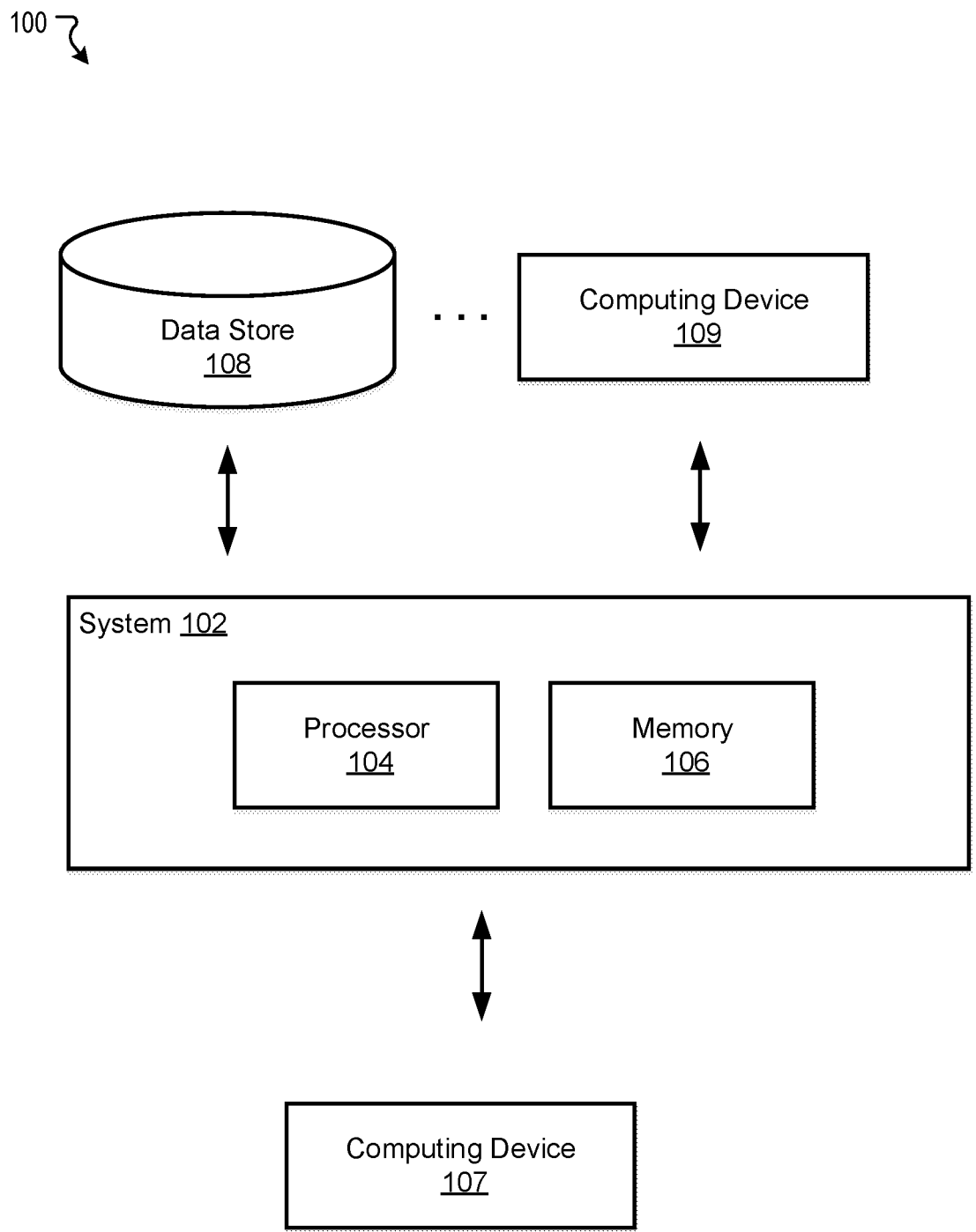
FIG. 1 illustrates an exemplary environment for data security grading, in accordance with various embodiments.

FIG. 1 illustrates an exemplary environment 100 for data security grading, in accordance with various embodiments. As shown in FIG. 1, the exemplary system 100 can comprise at least one computing system 102 that includes one or more processors 104 and memory 106. The memory 106 may be non-transitory and computer-readable. The memory 106 may store instructions that, when executed by the one or more processors 104, cause the one or more processors 104 to perform various operations described herein. The system 102 may be implemented on or as various devices such as mobile phone, tablet, server, computer, wearable device (smart watch), etc. The system 102 may be installed with appropriate software (e.g., data transfer program, etc.) and/or hardware (e.g., wire connections, wireless connections, etc.) to access other devices of the system 100.

The system 100 may include one or more data stores (e.g., a data store 108) and one or more computing devices (e.g., a computing device 109) that are accessible to the system 102. In some embodiments, the system 102 may be configured to obtain data from the data store 108 (e.g., a cloud database) and/or the computing device 109 (e.g., a server, a mobile phone, a vehicle computer).

The system 100 may further include one or more computing devices (e.g., a computing device 107) coupled to the system 102. In some embodiments, the system 107 may be implemented as a server, a mobile phone, a vehicle computer, a tablet, a wearable device (smart watch), etc.

In some embodiments, the system 102 and the one or more of the computing devices (e.g., the computing device 109) may be integrated in a single device or system. Alternatively, the system 102 and the one or more computing devices may operate as separate devices. The one or more data store (e.g., the data store 108) may be anywhere accessible to the system 102, for example, in the memory 106, in the computing device 109, in another device (e.g., network storage device) coupled to the system 102, or another storage location (e.g., cloud-based storage system, network file system, etc.), etc. The system 102 may be implemented as a single system or multiple systems coupled to each other. A data space comprising various source datasets and derived datasets may be provided by the single system or distributed over the multiple systems. In general, the system 102, the computing device 109, the data store 108, and the system 107 may be able to communicate with one another through one or more wired or wireless networks (e.g., the Internet) through which data can be communicated.

Figure 2:
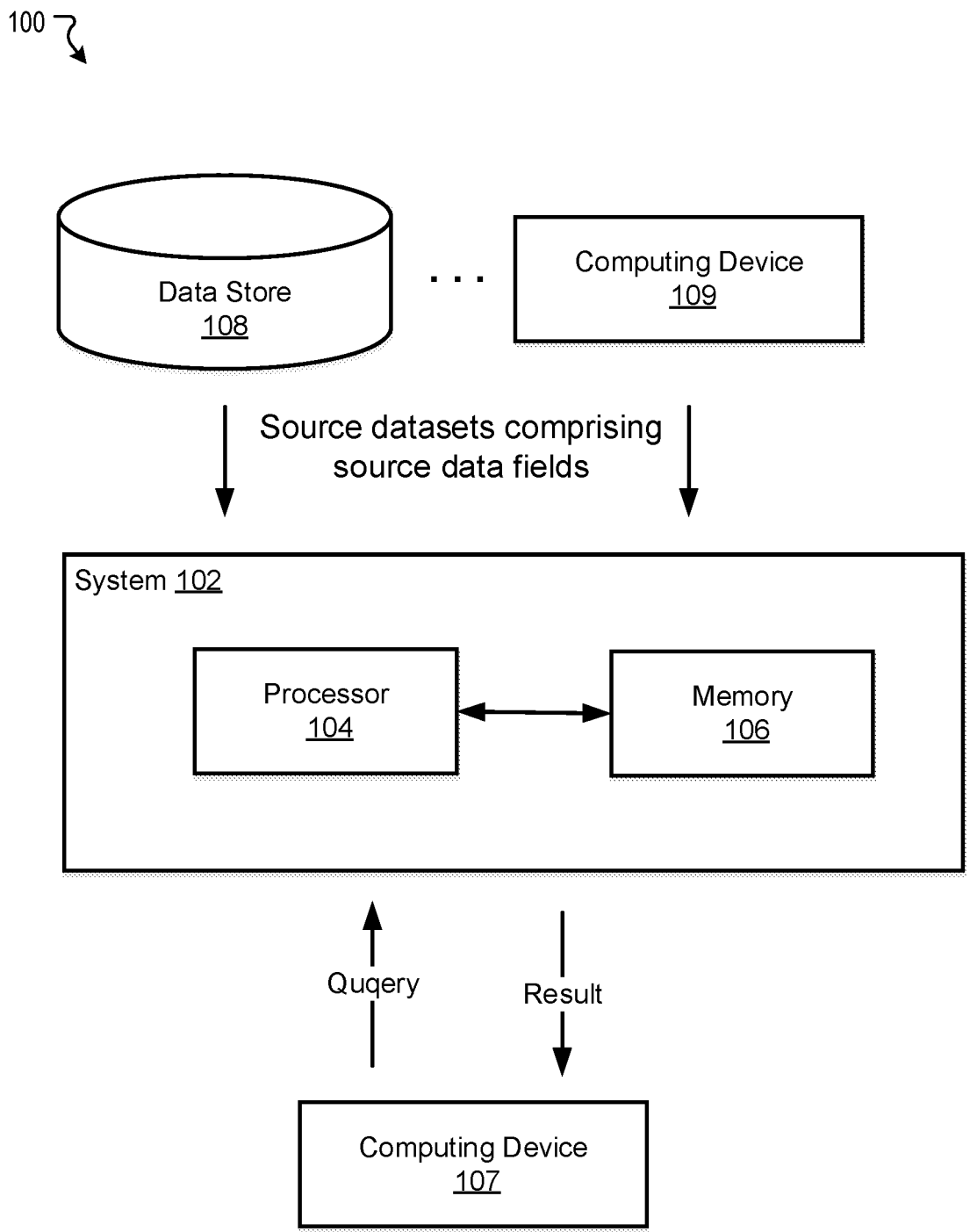
FIG. 2 illustrates an exemplary system for data security grading, in accordance with various embodiments.

FIG. 2 illustrates an exemplary system 200 for data security grading, in accordance with various embodiments. The operations shown in FIG. 2 and presented below are intended to be illustrative. In various embodiments, the system 102 may be configured to implement a data space (e.g., data warehouse). The data space may comprise data collected from systems outside the data warehouse (e.g., from the data store 108 or the computing device 109) and organized according to source data fields (e.g., employee name, salary, or other data fields stored in a tabular form).

In some embodiments, a data field may be regarded as a column in a data table storing various data entries. The system 102 may be configured to implement various data security grading steps and methods described herein.

In various embodiments, the computing device 107 may query the system 102 for the security level of certain data or of certain data field in the data space. Alternatively, the computing device 107 may query the system 102 for certain data in the data space. The system 102 may authenticate the current user of the computing device 107, for example, based on the log-in information, and determine if the current user's authorization satisfies the security level of the queried data. Correspondingly, the system 102 may return the data or deny access and return the corresponding results.

In some embodiments, the system 102 may receive a request to access a certain data field (the "query data field"). The data field may be associated with a category of data entries of a data space (e.g., a data warehouse) stored in the memory 106 and/or various other storage spaces. The data space may store the data in various formats (e.g., tabular datasets) and organized by the data fields. For example, for the data field "employ name," the corresponding data in the data field may comprise "John Doe," "Luke Webb," etc. When some or all of the data in the data field is queried by a user, the security level of the data field is required to determine if the user, as authenticated, has authorization to access the data. Here, the system 102 may search for the query data field from a security level table. The security level table may be stored in the memory 106 or otherwise accessible to the processor 104. The security level table may comprise security levels of various source data fields. For example, raw data collected from systems outside the data warehouse may be regarded as source data, and assigned with corresponding source data fields. The security levels of the source data fields may be determined based on rules. For example, one rule for grading source data fields may be that any data field containing the word "ID" in its field name is assigned the highest security level. A person of ordinary skill in the art may appreciate the application of various other alternative methods to grade security levels of the source data fields.

Here, after searching the security level table, the system 102 may, in response to finding the query data field from the security level table, obtain from the security level table a security level corresponding to the query data field. In response to not finding the query data field from the security level table, determine a security level corresponding to the query data field based at least on a lineage tree and the security level table. The lineage tree may trace the query data field to one or more source data fields, and the security data level table may comprise one or more security levels corresponding to the one or more source data fields. As described, the data space may comprise source data fields and derived data fields. Some derived data fields can each be obtained from one or more of the source data fields, and more derived data fields can each be obtained from one or more of the existing derived data fields and/or one or more of the source data fields. Thus, any derived data field can be traced back, at one or more ends through layers of intermediate derived data fields if necessary, to eventually reach the source data field(s) in its lineage tree. Further, each derivation may correspond to a derivation function, and the derivation function may be associated with a conversion of the security level(s) of the parent data field(s) to the security level of the child data field. Thus, the security levels of the source data field(s) can be used be obtain the security levels of the next layer of derived data fields and recursively applied to the next layer to obtain the security levels of all derived data fields.

Figure 3A:
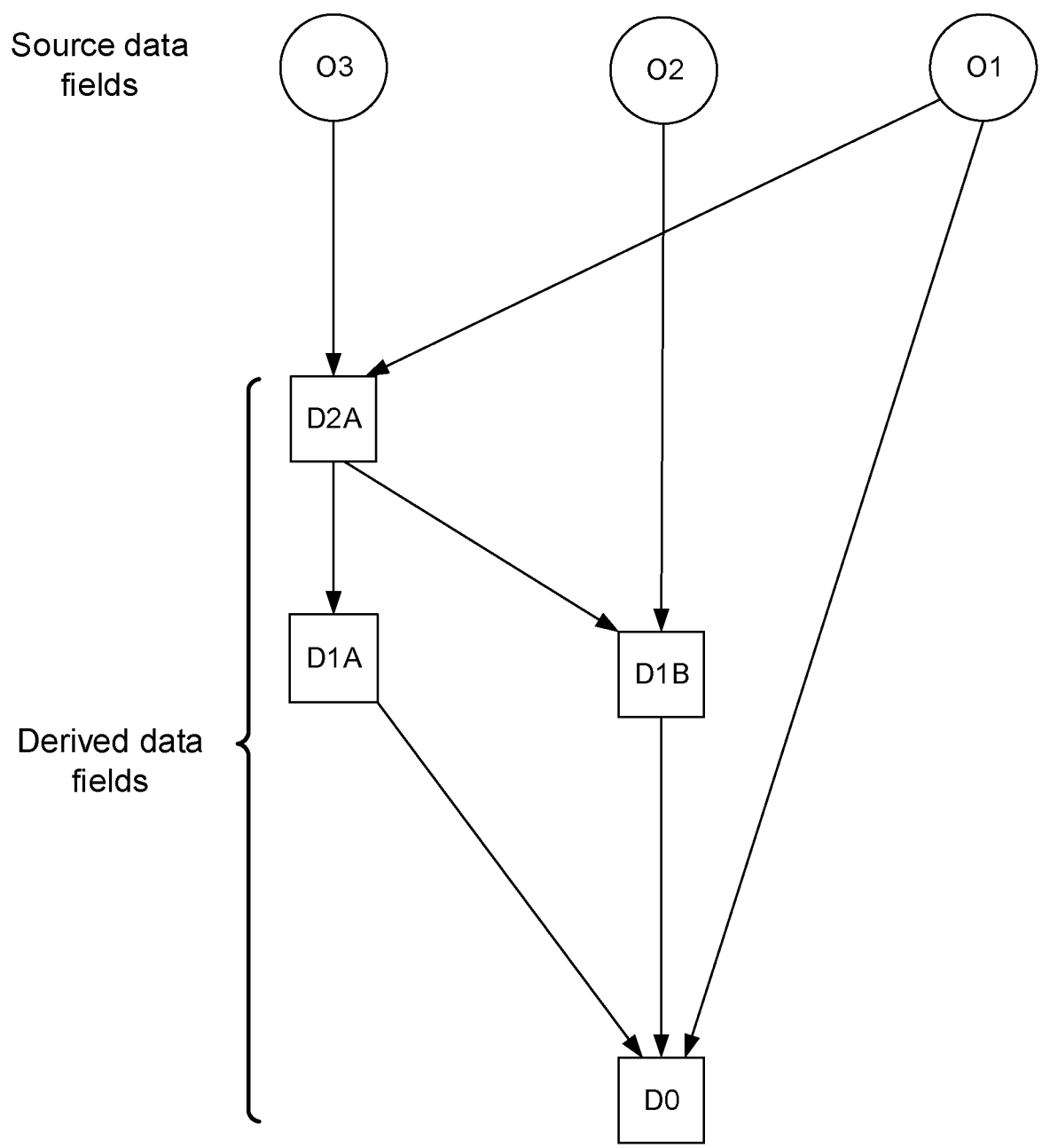
FIG. 3A illustrates an exemplary lineage tree for data security grading, in accordance with various embodiments.

Referring to FIG. 3A, FIG. 3A illustrates an exemplary lineage tree for data security grading, in accordance with various embodiments. The operations shown in FIG. 3A and presented below are intended to be illustrative. This figure illustrates the lineage tree for derived data field D0. In this figure, all source data fields are in circles, and all derived data fields are in squares. The source data fields can be considered as roots of the lineage tree, and the derived data fields can be considered as branches or leaves. In some embodiments, the lineage tree may trace a derived data field (e.g., data field D0) to one or more first level parent data fields (e.g., data fields D1A, D1B, and O1) that are immediately above the data filed D0. Each first level parent data field can be the source data field (e.g., O1) or a first level derived data field (e.g., data fields D1A and D1B), and the derived data field may derive from the one or more first level parent data fields based on a deriving function. For the first level derived data field, the lineage tree may trace the first level derived data field to one or more second level parent data fields (e.g., tracing data field D1A to data field D2A, tracing data field D1B to data field D2A and O2), the each second level parent data field being the source data field or a second level derived data field, and the first level derived data field deriving from the one or more second level parent data fields based on another deriving function. The tracing may be replicable on any derived data field until tracing to one or more of the source date fields (e.g., data field D2A can be further traced to O3 and O1, and no further tracing is needed from the source data fields). The various levels of derived data fields are relative to the data field D0. That is, the level may be the number of arrowed paths needed in the lineage tree to reach the data field D0. Each arrow may refer to a derivation corresponding to a deriving function, pointing from a parent data field to a child data field (any source or derived data field can be a parent data field, and only a derived data field can be a child data field). The derivation function may be any algorithm or the equivalent, such as summing, adding, multiplying, counting, etc., as designated by a user. For example, the data field D1A may be a sum of data entries in the data field D2A. For another example, the data field D2A and the data field O2 may have the same number of entries, and the data field D1B may be an one-to-one addition of the data entries of D2A and the data entries of O2.

Further, the lineage tree may comprise the derivation functions, each associated with a security level conversion from the corresponding parent data field(s) to the child data field. Such corresponding relationship may be stored in a table. For example, for the summing function (summing entries in two or more parent data fields into a child date field), the highest data security level among the parent data fields is passed to the security level of the child data field. That is, the obtained derived data field's security level may be the highest of the security levels of the first level parent data fields. For another example, for the counting function (counting a number of data entries in a parent data field to obtain a child data field), the security level of child data field can be set to an arbitrarily low level. Thus, determining the security level corresponding to the query data field based at least on the lineage tree and the security level table may comprise, for the each derived data field at any level, obtaining the derived data field's security level based at least on (1) the deriving function of the derived data field and (2) security levels of the first level parent data fields of the derived data field. Such determination algorithm can be recursively applied layer by layer to eventually link to the known security levels of the source data fields in the security level table at the roots of the lineage tree, and thus by plugging in the security levels of the source fields, the security level of data field D0 can be obtained. Further, the security levels of any derived data field can be updated automatically and dynamically, with any change in the data (e.g., change of the data entries, change of the derivation functions, addition of data fields, etc.).

In some embodiments, determining the security level corresponding to the query data field based at least on the lineage tree and the security level table may further comprise determining one of the derived data fields (e.g., the data field D0) corresponding to the query data field and using the determined derived data field's security level as the query data field's security level. That is, if the query data field is D0, D0's security level can be invoked to process the query. In some other embodiments, as described above, if the query data field matches with a stored data field in the security level table, the security level corresponding to the stored data field can be directly obtained from the security level table as the security level corresponding to the query data field.

Referring back to FIG. 2, in order to accurately return the security level of the query data field, the system 102 may be configured to perform various steps in advance. In some embodiments, the system 102 may grade one or more security levels of one or more source data fields in a data space according to one or more rules. As described above, in addition to the source data fields, the data space may further comprise one or more derived data fields each containing data derived from one or more parent data fields, wherein the parent data field is the source data field or another derived data field. Upon receiving a query for a query data field, the system 102 may record a SQL (Structured Query Language) statement for producing the query data field. For example, a SQL statement may comprise counting a number of data entries in an existing derived data field, and the counted number may become a newly derived data field. The recording may be performed in real-time. Then, the system 102 may parse the SQL statement (e.g., by converting the SQL statement to an abstract syntax tree), and construct a lineage tree based on the parsed SQL statement, the lineage tree tracing the query data field to one or more parent data fields. For example, to parse the SQL statement, the system 102 may convert the SQL statement to an abstract syntax tree, and to construct the lineage tree, the system 102 may traverse the abstract syntax tree to identify derivation relations among the query data field and one or more of the source data fields and/or derived data fields. Accordingly, the system 102 may determine a security level of the query data field based at least on the lineage tree and one or more security levels of the one or more parent data fields of the query data field.

Figure 3B:
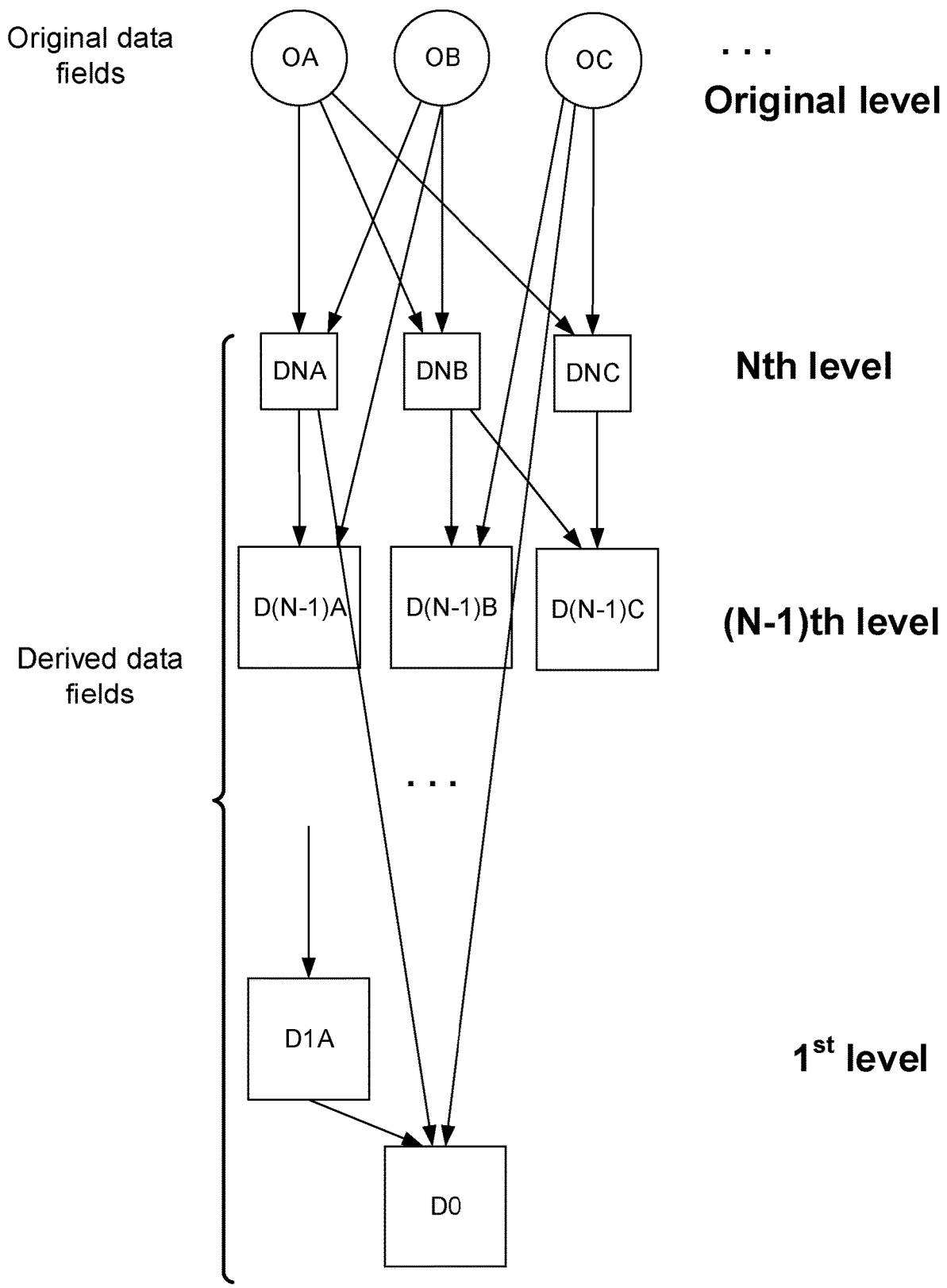
FIG. 3B illustrates another exemplary lineage tree for data security grading, in accordance with various embodiments.

Referring to FIG. 3B, FIG. 3B illustrates another exemplary lineage tree for data security grading, in accordance with various embodiments. The operations shown in FIG. 3B and presented below are intended to be illustrative. The symbols in FIG. 3B are similar to those in FIG. 3A described above. The lineage tree illustrated in FIG. 3B can be regarded as a generalization of the lineage tree illustrated in FIG. 3A. In some embodiments, to determine the security level of the query data field based at least on the lineage tree and the one or more security levels of the one or more parent data fields of the query data field, the system 102 may: (1) determine one or more Nth security levels corresponding to one or more Nth level derived data fields deriving from the one or more source data fields in the lineage tree based on one or more corresponding Nth deriving functions and the security levels of the one or more source data fields; (2) determine one or more (N−1)th security levels corresponding to one or more (N−1)th level derived data fields deriving from the one or more source data fields and/or the Nth level derived data fields in the lineage tree based on one or more corresponding (N−1)th deriving functions and the security levels of the one or more source data fields and/or the one or more Nth security levels; and repeat step (2) in the lineage tree towards the query data field to determine the security level of the query data field. Here, the security levels of the query data field and the derived data fields may be determined based on immediate parent data fields (parent data fields directly pointing to the child data field). For example, the security levels of Nth level data fields can be obtained from those of the source data fields, the security levels of (N−1)th level data fields can be obtained from those of the Nth level data fields, and so forth to obtain the security level of D0. In this figure, the level of a child data field is one level lower than the lowest level of its parent data field. For example, data field D(N−1)B derives from source data field OC and derived data field DNB. Since data field DNB of Nth level is the lowest among all parent data fields of data field D(N−1)B (here, original level>Nth level>(N−1)th level . . . >$1^{st}$ level), the level of data field D(N−1)B is (N−1)th.

As such, the security level of any derived data field can be determined based on its lineage tree tracing to the security levels of one or more source data fields. In the data space, each individual lineage tree may capture the dynamic change of the corresponding derived data field. Since the number of source data fields may be more stable and much smaller in size than the derived data fields, the grading of the source data fields can be completed in advance and applied in the lineage trees to obtain the security levels of the derived data fields in accordance with the various levels of derivation functions.

Figure 4A:
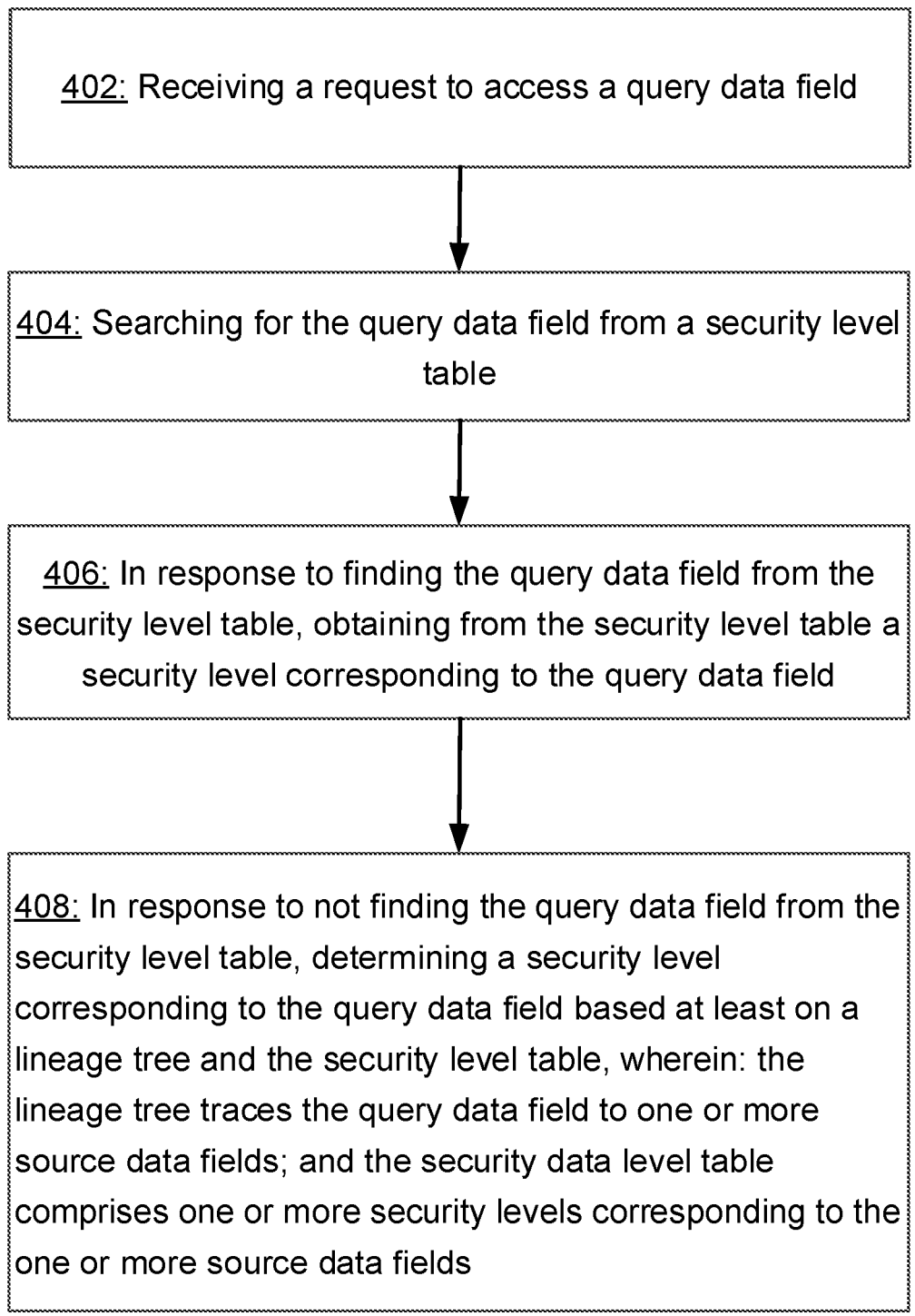
FIG. 4A illustrates a flowchart of an exemplary method for data security grading, in accordance with various embodiments.

FIG. 4A illustrates a flowchart of an exemplary method 400, according to various embodiments of the present disclosure. The method 400 may be implemented in various environments including, for example, the environment 100 of FIG. 1. The exemplary method 400 may be implemented by one or more components of the system 102 (e.g., the processor 104, the memory 106). The exemplary method 400 may be implemented by multiple systems similar to the system 102 (e.g., a computer). The operations of method 400 presented below are intended to be illustrative. Depending on the implementation, the exemplary method 400 may include additional, fewer, or alternative steps performed in various orders or in parallel.

At block 402, a request to access a query data field may be received. At block 404, the query data field may be searched for from a security level table. At block 406, in response to finding the query data field from the security level table, a security level corresponding to the query data field may be obtained from the security level table. At block 408, in response to not finding the query data field from the security level table, a security level corresponding to the query data field may be determined based at least on a lineage tree and the security level table. The lineage tree may trace the query data field to one or more source data fields, and the security data level table may comprise one or more security levels corresponding to the one or more source data fields.

FIG. 4B illustrates a flowchart of an exemplary method 410, according to various embodiments of the present disclosure. The method 410 may be implemented in various environments including, for example, the environment 100 of FIG. 1. The exemplary method 410 may be implemented by one or more components of the system 102 (e.g., the processor 104, the memory 106). The exemplary method 410 may be implemented by multiple systems similar to the system 102 (e.g., a computer). The operations of method 410 presented below are intended to be illustrative. Depending on the implementation, the exemplary method 410 may include additional, fewer, or alternative steps performed in various orders or in parallel.

At block 412, one or more security levels of one or more source data fields in a data space may be graded according to one or more rules, the data space further comprising one or more derived data fields each containing data derived from one or more parent data fields, wherein the parent data field is the source data field or another derived data field. At block 414, for a query data field, a SQL (Structured Query Language) statement for producing the query data field may be recorded. At block 416, the SQL statement may be parsed. At block 418, a lineage tree based on the parsed SQL statement may be constructed, the lineage tree tracing the query data field to one or more parent data fields. At block 419, a security level of the query data field may be determined based at least on the lineage tree and one or more security levels of the one or more parent data fields of the query data field.

Figure 4C:
FIG. 4C illustrates a flowchart of another exemplary method for data security grading, in accordance with various embodiments.

FIG. 4C illustrates a flowchart of an exemplary method 420, according to various embodiments of the present disclosure. The method 420 may be implemented in various environments including, for example, the environment 100 of FIG. 1. The exemplary method 420 may be implemented by one or more components of the system 102 (e.g., the processor 104, the memory 106). The exemplary method 420 may be implemented by multiple systems similar to the system 102 (e.g., a computer). The operations of method 420 presented below are intended to be illustrative. Depending on the implementation, the exemplary method 420 may include additional, fewer, or alternative steps performed in various orders or in parallel.

At block 422, a query associated with a query data field may be received. For example, the query may invoke certain data in the query data field, certain property of the query data field, etc. At block 424, a security level of the query data field may be determined based on: one or more respective security levels of one or more immediate upper level data fields of the query data field, and a deriving function deriving data in the query data field from data in the one or more immediate upper level data fields. As described above, the query data fields can be traced to its first level parent data fields (the one or more immediate upper level data fields), which may include sources data fields and/or first level derived data fields. The first level derived data fields can be similarly traced to their one or more immediate upper level data fields respectively, and each tracing front may end at source data fields. Here, the security levels of the intermediate data fields (the data fields in the query data field's lineage tree other than the source data fields and the query data field) can be dynamically generated and obtained when the query data field is received, and may not necessarily be pre-stored and searched. In some embodiments, for each of the one or more immediate upper level data fields that is a source data field, a security level associated with the each source data field to the block 424 determination may be applied. For each of the one or more immediate upper level data fields that is not a source data field, the block 424 can be repeated treating the immediate upper level data field as the query data field, until only source data fields are obtained for the immediate upper level data fields and a security level associated with the each source data field may be applied to the block 424 determination.

The techniques described herein are implemented by one or more special-purpose computing devices. The special-purpose computing devices may be hard-wired to perform the techniques, or may include circuitry or digital electronic devices such as one or more application-specific integrated circuits (ASICs) or field programmable gate arrays (FPGAs) that are persistently programmed to perform the techniques, or may include one or more hardware processors programmed to perform the techniques pursuant to program instructions in firmware, memory, other storage, or a combination. Such special-purpose computing devices may also combine custom hard-wired logic, ASICs, or FPGAs with custom programming to accomplish the techniques. The special-purpose computing devices may be desktop computer systems, server computer systems, portable computer systems, handheld devices, networking devices or any other device or combination of devices that incorporate hard-wired and/or program logic to implement the techniques. Computing device(s) are generally controlled and coordinated by operating system software. Conventional operating systems control and schedule computer processes for execution, perform memory management, provide file system, networking, I/O services, and provide a user interface functionality, such as a graphical user interface ("GUI"), among other things.

Figure 5:
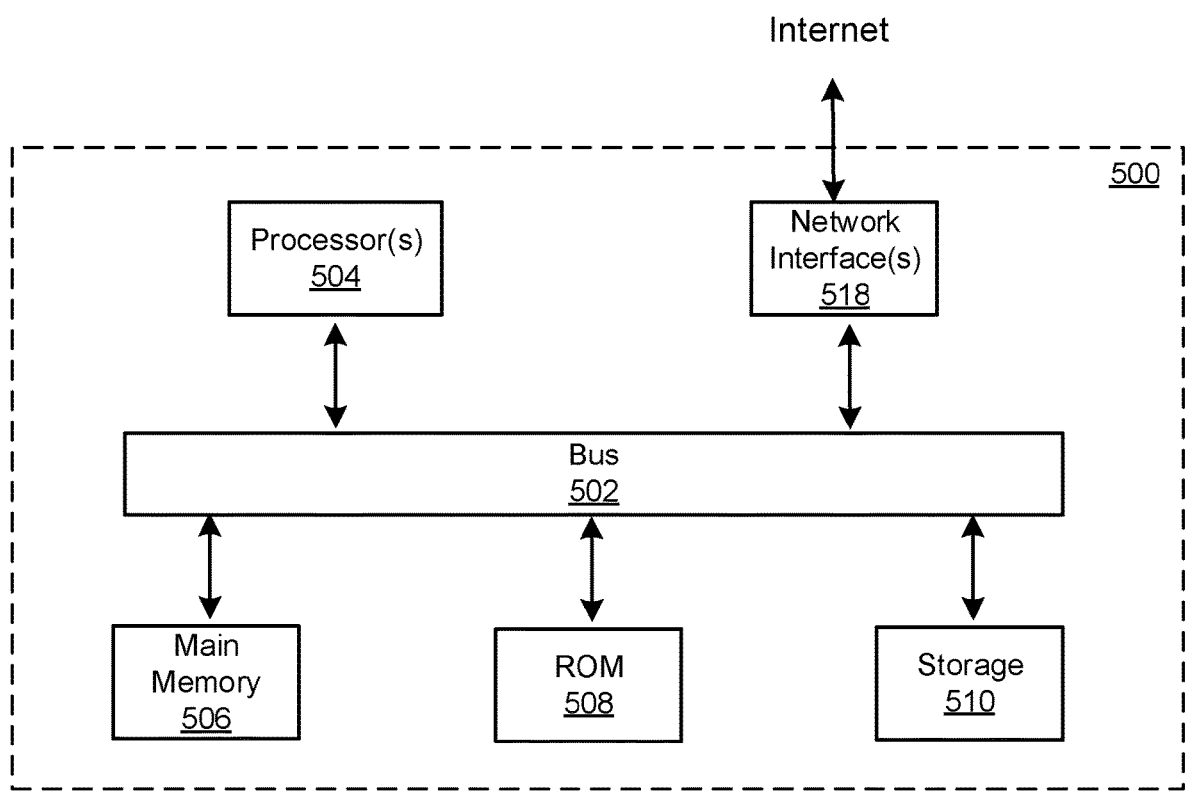
FIG. 5 illustrates a block diagram of an exemplary computer system in which any of the embodiments described herein may be implemented.

FIG. 5 is a block diagram that illustrates a computer system 500 upon which any of the embodiments described herein may be implemented. The system 500 may correspond to the system 102 described above. The computer system 500 includes a bus 502 or other communication mechanism for communicating information, one or more hardware processors 504 coupled with bus 502 for processing information. Hardware processor(s) 504 may be, for example, one or more general purpose microprocessors. The processor(s) 504 may correspond to the processor 104 described above.

The computer system 500 also includes a main memory 506, such as a random access memory (RAM), cache and/or other dynamic storage devices, coupled to bus 502 for storing information and instructions to be executed by processor 504. Main memory 506 also may be used for storing temporary variables or other intermediate information during execution of instructions to be executed by processor 504. Such instructions, when stored in storage media accessible to processor 504, render computer system 500 into a special-purpose machine that is customized to perform the operations specified in the instructions. The computer system 500 further includes a read only memory (ROM) 508 or other static storage device coupled to bus 502 for storing static information and instructions for processor 504. A storage device 510, such as a magnetic disk, optical disk, or USB thumb drive (Flash drive), etc., is provided and coupled to bus 502 for storing information and instructions. The main memory 506, the ROM 508, and/or the storage 510 may correspond to the memory 106 described above.

The computer system 500 may implement the techniques described herein using customized hard-wired logic, one or more ASICs or FPGAs, firmware and/or program logic which in combination with the computer system causes or programs computer system 500 to be a special-purpose machine. According to one embodiment, the techniques herein are performed by computer system 500 in response to processor(s) 504 executing one or more sequences of one or more instructions contained in main memory 506. Such instructions may be read into main memory 506 from another storage medium, such as storage device 510. Execution of the sequences of instructions contained in main memory 506 causes processor(s) 504 to perform the process steps described herein. In alternative embodiments, hard-wired circuitry may be used in place of or in combination with software instructions.

The main memory 506, the ROM 508, and/or the storage 510 may include non-transitory storage media. The term "non-transitory media," and similar terms, as used herein refers to any media that store data and/or instructions that cause a machine to operate in a specific fashion. Such non-transitory media may comprise non-volatile media and/or volatile media. Non-volatile media includes, for example, optical or magnetic disks, such as storage device 510. Volatile media includes dynamic memory, such as main memory 506. Common forms of non-transitory media include, for example, a floppy disk, a flexible disk, hard disk, solid state drive, magnetic tape, or any other magnetic data storage medium, a CD-ROM, any other optical data storage medium, any physical medium with patterns of holes, a RAM, a PROM, and EPROM, a FLASH-EPROM, NVRAM, any other memory chip or cartridge, and networked versions of the same.

The computer system 500 also includes a network interface 518 coupled to bus 502. Network interface 518 provides a two-way data communication coupling to one or more network links that are connected to one or more local networks. For example, network interface 518 may be an integrated services digital network (ISDN) card, cable modem, satellite modem, or a modem to provide a data communication connection to a corresponding type of telephone line. As another example, network interface 518 may be a local area network (LAN) card to provide a data communication connection to a compatible LAN (or WAN component to communicated with a WAN). Wireless links may also be implemented. In any such implementation, network interface 518 sends and receives electrical, electromagnetic or optical signals that carry digital data streams representing various types of information.

The computer system 500 can send messages and receive data, including program code, through the network(s), network link and network interface 518. In the Internet example, a server might transmit a requested code for an application program through the Internet, the ISP, the local network and the network interface 518.

The received code may be executed by processor 504 as it is received, and/or stored in storage device 510, or other non-volatile storage for later execution.

Each of the processes, methods, and algorithms described in the preceding sections may be embodied in, and fully or partially automated by, code modules executed by one or more computer systems or computer processors comprising computer hardware. The processes and algorithms may be implemented partially or wholly in application-specific circuitry.

The various features and processes described above may be used independently of one another, or may be combined in various ways. All possible combinations and sub-combinations are intended to fall within the scope of this disclosure. In addition, certain method or process blocks may be omitted in some implementations. The methods and processes described herein are also not limited to any particular sequence, and the blocks or states relating thereto can be performed in other sequences that are appropriate. For example, described blocks or states may be performed in an order other than that specifically disclosed, or multiple blocks or states may be combined in a single block or state. The exemplary blocks or states may be performed in serial, in parallel, or in some other manner. Blocks or states may be added to or removed from the disclosed exemplary embodiments. The exemplary systems and components described herein may be configured differently than described. For example, elements may be added to, removed from, or rearranged compared to the disclosed exemplary embodiments.

The various operations of exemplary methods described herein may be performed, at least partially, by an algorithm. The algorithm may be comprised in program codes or instructions stored in a memory (e.g., a non-transitory computer-readable storage medium described above). Such algorithm may comprise a machine learning algorithm. In some embodiments, a machine learning algorithm may not explicitly program computers to perform a function, but can learn from training data to make a predictions model that performs the function.

The various operations of exemplary methods described herein may be performed, at least partially, by one or more processors that are temporarily configured (e.g., by software) or permanently configured to perform the relevant operations. Whether temporarily or permanently configured, such processors may constitute processor-implemented engines that operate to perform one or more operations or functions described herein.

Similarly, the methods described herein may be at least partially processor-implemented, with a particular processor or processors being an example of hardware. For example, at least some of the operations of a method may be performed by one or more processors or processor-implemented engines. Moreover, the one or more processors may also operate to support performance of the relevant operations in a "cloud computing" environment or as a "software as a service" (SaaS). For example, at least some of the operations may be performed by a group of computers (as examples of machines including processors), with these operations being accessible via a network (e.g., the Internet) and via one or more appropriate interfaces (e.g., an Application Program Interface (API)).

The performance of certain of the operations may be distributed among the processors, not only residing within a single machine, but deployed across a number of machines. In some exemplary embodiments, the processors or processor-implemented engines may be located in a single geographic location (e.g., within a home environment, an office environment, or a server farm). In other exemplary embodiments, the processors or processor-implemented engines may be distributed across a number of geographic locations.

Throughout this specification, plural instances may implement components, operations, or structures described as a single instance. Although individual operations of one or more methods are illustrated and described as separate operations, one or more of the individual operations may be performed concurrently, and nothing requires that the operations be performed in the order illustrated. Structures and functionality presented as separate components in exemplary configurations may be implemented as a combined structure or component. Similarly, structures and functionality presented as a single component may be implemented as separate components. These and other variations, modifications, additions, and improvements fall within the scope of the subject matter herein.

Although an overview of the subject matter has been described with reference to specific exemplary embodiments, various modifications and changes may be made to these embodiments without departing from the broader scope of embodiments of the present disclosure. Such embodiments of the subject matter may be referred to herein, individually or collectively, by the term "invention" merely for convenience and without intending to voluntarily limit the scope of this application to any single disclosure or concept if more than one is, in fact, disclosed.

The embodiments illustrated herein are described in sufficient detail to enable those skilled in the art to practice the teachings disclosed. Other embodiments may be used and derived therefrom, such that structural and logical substitutions and changes may be made without departing from the scope of this disclosure. The Detailed Description, therefore, is not to be taken in a limiting sense, and the scope of various embodiments is defined only by the appended claims, along with the full range of equivalents to which such claims are entitled.

Any process descriptions, elements, or blocks in the flow diagrams described herein and/or depicted in the attached figures should be understood as potentially representing modules, segments, or portions of code which include one or more executable instructions for implementing specific logical functions or steps in the process. Alternate implementations are included within the scope of the embodiments described herein in which elements or functions may be deleted, executed out of order from that shown or discussed, including substantially concurrently or in reverse order, depending on the functionality involved, as would be understood by those skilled in the art.

As used herein, the term "or" may be construed in either an inclusive or exclusive sense. Moreover, plural instances may be provided for resources, operations, or structures described herein as a single instance. Additionally, boundaries between various resources, operations, engines, and data stores are somewhat arbitrary, and particular operations are illustrated in a context of specific illustrative configurations. Other allocations of functionality are envisioned and may fall within a scope of various embodiments of the present disclosure. In general, structures and functionality presented as separate resources in the exemplary configurations may be implemented as a combined structure or resource. Similarly, structures and functionality presented as a single resource may be implemented as separate resources. These and other variations, modifications, additions, and improvements fall within a scope of embodiments of the present disclosure as represented by the appended claims. The specification and drawings are, accordingly, to be regarded in an illustrative rather than a restrictive sense.

Conditional language, such as, among others, "can," "could," "might," or "may," unless specifically stated otherwise, or otherwise understood within the context as used, is generally intended to convey that certain embodiments include, while other embodiments do not include, certain features, elements and/or steps. Thus, such conditional language is not generally intended to imply that features, elements and/or steps are in any way required for one or more embodiments or that one or more embodiments necessarily include logic for deciding, with or without user input or prompting, whether these features, elements and/or steps are included or are to be performed in any particular embodiment.

The invention claimed is:

1. A method for data security grading, implementable by a computer, the method comprising:
   receiving a request to access a query data field;
   searching for the query data field from a security level table;
   in response to finding the query data field from the security level table, obtaining from the security level table a security level corresponding to the query data field; and
   in response to not finding the query data field from the security level table, determining a security level corresponding to the query data field based at least on the security level table and a lineage tree tracing the query data field to one or more source data fields, wherein:
      the lineage tree traces the query data field to one or more first level parent data fields, the each first level parent data field being one of the one or more source data fields or a first level derived data field, and the query data field deriving from the one or more first level parent data fields based on a first deriving function;
      for the first level derived data field, the lineage tree traces the first level derived data field to one or more second level parent data fields, the each second level parent data field being one of the one or more source data fields or a second level derived data field, and the first level derived data field deriving from the one or more second level parent data fields based on a second deriving function;
      the tracing is replicable on any derived data field until tracing to the one or more source data fields;
      the lineage tree comprises the first and second deriving functions; and
      the security data level table comprises one or more security levels corresponding to the one or more source data fields.

2. The method of claim 1, wherein determining the security level corresponding to the query data field based at least on the lineage tree and the security level table comprises:
   for the each derived data field at any level, obtaining the derived data field's security level based at least on (1) the deriving function of the derived data field and (2) security levels of the first level parent data fields of the derived data field; and
   determining one of the derived data fields corresponding to the query data field and using the determined derived data field's security level as the query data field's security level.

3. The method of claim 2, wherein:
   the obtained derived data field's security level is the highest of the security levels of the first level parent data fields of the derived data field.

4. A system for data security grading, comprising a processor configured to:
   receive a request to access a query data field;
   search for the query data field from a security level table;
   in response to finding the query data field from the security level table, obtain from the security level table a security level corresponding to the query data field; and
   in response to not finding the query data field from the security level table, determining a security level corresponding to the query data field based at least on the security level table and a lineage tree tracing the query data field to one or more source data fields, wherein:
      the lineage tree traces the query data field to one or more first level parent data fields, the each first level parent data field being one of the one or more source data fields or a first level derived data field, and the query data field deriving from the one or more first level parent data fields based on a first deriving function;
      for the first level derived data field, the lineage tree traces the first level derived data field to one or more second level parent data fields, the each second level parent data field being one of the one or more source data fields or a second level derived data field, and the first level derived data field deriving from the one or more second level parent data fields based on a second deriving function;
      the tracing is replicable on any derived data field until tracing to the one or more source data fields;
      the lineage tree comprises the first and second deriving functions; and
      the security data level table comprises one or more security levels corresponding to the one or more source data fields.

5. The system of claim 4, wherein to determine the security level corresponding to the query data field based at least on the lineage tree and the security level table, the processor is configured to:
   for the each derived data field at any level, obtain the derived data field's security level based at least on (1) the deriving function of the derived data field and (2) security levels of the first level parent data fields of the derived data field; and
   determine one of the derived data fields corresponding to the query data field and using the determined derived data field's security level as the query data field's security level.

6. The system of claim 5, wherein:
   the obtained derived data field's security level is the highest of the security levels of the first level parent data fields of the derived data field.

* * * * *